United States Patent

Bird

[15] 3,645,589
[45] Feb. 29, 1972

[54] AIR BEARING WITH LOW TENSILE STRENGTH PERMEABLE SLEEVE

[72] Inventor: Melvyn R. Bird, Huron, Ohio

[73] Assignee: General Motors Corporation, Detroit, Mich.

[22] Filed: Dec. 3, 1970

[21] Appl. No.: 94,855

[52] U.S. Cl. ..............................................308/9, 308/107
[51] Int. Cl. ...................................F16c 17/16, F16c 13/02
[58] Field of Search ........................................308/107, 122, 9

[56] References Cited

UNITED STATES PATENTS 3,527,510  9/1970  Christiansen ........................308/107

Primary Examiner—Edgar W. Geoghegan
Assistant Examiner—Frank Susko
Attorney—J. L. Carpenter and F. J. Fodale

[57] ABSTRACT

An externally pressurized, gas-bearing roll shell has a low tensile strength, permeable sleeve restricting gas flow to the gas load carrying layer. Three schemes are shown for mounting the permeable sleeve on a stationary mandrel in such a manner that excessive tensile stress is not imparted to the sleeve.

7 Claims, 4 Drawing Figures

Patented Feb. 29, 1972

3,645,589

INVENTOR.
Melvyn R. Bird

BY
F. G. Fodale
ATTORNEY

AIR BEARING WITH LOW TENSILE STRENGTH PERMEABLE SLEEVE

This invention relates generally to externally pressurized gas-bearing roll shells and more specifically to such roll shells which utilize a permeable sleeve to distribute pressurized gas from a plenum to the load-carrying gas film.

In such bearings, performance is to a degree dependent upon uniformity of permeability of the sleeve. For instance, the radial load-carrying capacity is highest and the bearing is stablest against tilting when the permeability of the sleeve is constant along its length. Uniformity in permeability is easily provided in a part fabricated from discrete, substantially uniform particles as, for instance, in the case of porous ceramics, carbons, graphites, and carbon-graphites. Such materials, however, have the drawback that they have a relatively low tensile strength; so low in fact that the parts cannot be press fitted onto a stub, shaft or hub and maintain a tight fit over a reasonable temperature gradient. This invention is directed to the mounting of such low tensile strength, permeable sleeves on steel or the like shafts so that their advantage of uniform permeability may be used in an externally pressurized gas bearing to improve its performance.

The exact nature of this invention, as well as other objects and advantages thereof, will be readily apparent from consideration of the following specification relating to the annexed drawing in which.

Figure 1:
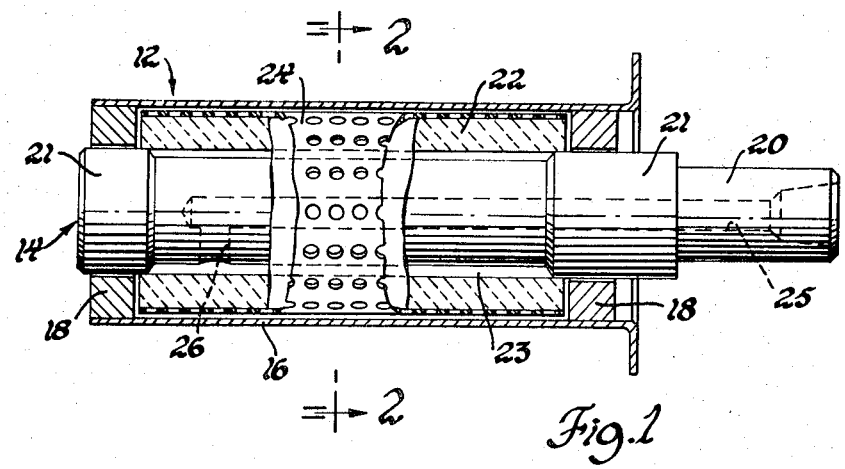
FIG. 1 is an elevation view, partially in section, of an externally pressurized, permeable sleeve gas-bearing separator roll in accordance with a first embodiment of this invention.
Figure 2:
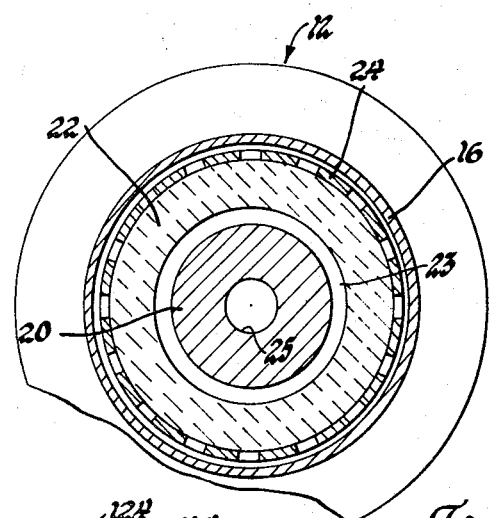
FIG. 2 is a section taken along the line 2—2 of FIG. 1 and looking in the direction of the arrows.

Referring now to the first embodiment of FIGS. 1 and 2, the externally pressurized gas-bearing separator roll 12 comprises a stationary shaft assembly 14 surrounded by a steel roll shell 16 journaled on a load-carrying gas film and centered by gas thrust bearings, parts of which comprise the annular rings 18 on the roll shell 16. The operation of this general type of gas-bearing device is well known and for further details, resort may be had to U.S. Pat. No. 3,374,039 issued to Donald A. Voorhies on Mar. 19, 1968, for an "Antifriction Bearing" and U.S. Pat. No. 3,527,510 issued to Paul J. Christiansen on Sept. 8, 1970, for an "Antihammer Device for Air Spindles," the teachings of which are incorporated herein by reference.

The improvement in the first embodiment resides in the shaft assembly 14 which includes a steel shaft 20, a permeable low tensile strength sleeve 22 (such as ceramic or carbon-graphite) mounted on larger diameter portions 21 of the shaft so as to form a plenum 23 therebetween, and a perforate steel sleeve 24, surrounding the permeable sleeve 22.

The plenum 23, when connected to a source of pressurized gas through passages 25 and 26, supplies the gas to the load-carrying gas film through the permeable sleeve 22 and perforate sleeve 24. The permeability of the sleeve 22 and the number and spacing of the holes in the sleeve 24, of course, vary with the size and desired load-carrying capacity of the roll shell 16.

The low tensile strength permeable sleeve 22 is compressively loaded into tight frictional engagement with the shaft portion 21 by the metal sleeve 24. The tight frictional engagement seals plenum 23 at the shaft-permeable sleeve interface and axially locates the permeable sleeve 22 on the shaft 20. By compressively loaded, it is meant that the inner diameter of the perforate sleeve 24 is smaller than the outer diameter of the permeable sleeve 22 to a sufficient degree, such that a tight frictional engagement (interference fit) exists between the permeable sleeve 22 and the shaft portions 21 for the operational temperature range of the device without the tight engagement producing a hoop tensile stress exceeding the tensile strength of the material in the permeable sleeve 22. Other advantages of the first embodiment are that the axial and radial flow of pressurized gas through the permeable sleeve and therefore radial and thrust capacity can be easily adjusted with respect to one another by varying the perforation pattern of the steel shell 24. Another advantage of this embodiment is that since the perforate sleeve 24 and roll shell 16 are both steel, the gas-bearing space is easily maintained over an operational temperature gradient since the thermal expansion of the steel perforate sleeve 24 is the significant factor affecting its growth. In fact, this advantage can be realized simply by selecting the same material for the roll shell and the perforate sleeve so long as the material has a modulus of elasticity significantly higher than the modulus of elasticity of the material in the permeable sleeve 22.

The permeable sleeve 22 and perforate sleeve 24 subassembly might be fabricated by heating the sleeve 24 until it expands sufficiently to allow insertion of the permeable sleeve 22 and allowing the perforate sleeve 24 to cool and shrink into the permeable sleeve. Alternatively, the permeable sleeve 22 might be molded into the perforate sleeve 24, in which case the permeable material could be allowed to fill the holes of the perforate sleeve and present a continuous outer surface.

Figure 3:
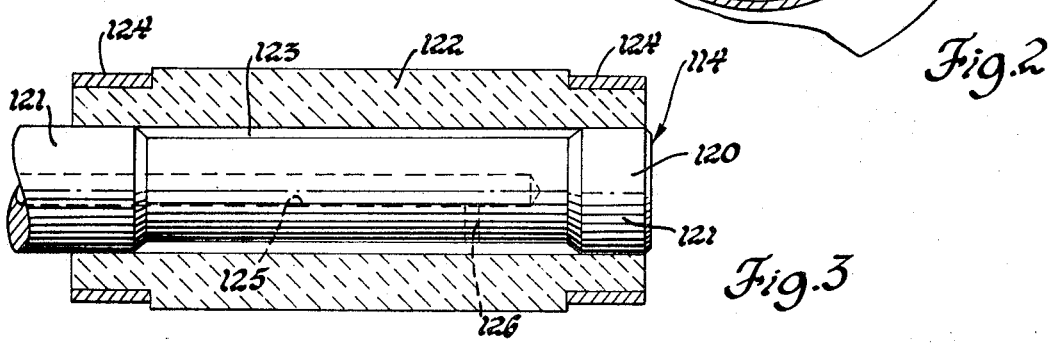
FIG. 3 is an elevation partially in section of a second embodiment of the invention with the outer shell removed for simplicity.

Referring now to FIG. 3, a second embodiment of the invention is shown. Since the improvement lies solely in the shaft assembly, only the shaft assembly 114 of the second embodiment has been shown. It includes steel shaft 120 having a low tensile strength permeable sleeve 122 mounted on its enlarged portions 121 and forming a plenum 123 fluidly connected to a source of pressurized gas by passages 125 and 126. Rather than a perforate sleeve compressively loading the permeable sleeve into the shaft, however, a pair of steel bands 124 are utilized. These bands 124 embrace the outer surface of the permeable sleeve 122 in the areas where the sleeve 122 is mounted on the shaft portions 121. The steel bands impart a compressive hoop stress to these areas of the sleeve 122 so that there is an interference fit between the sleeve 122 and the shaft portions 121 without a damaging amount of tensile hoop stress developing.

Figure 4:
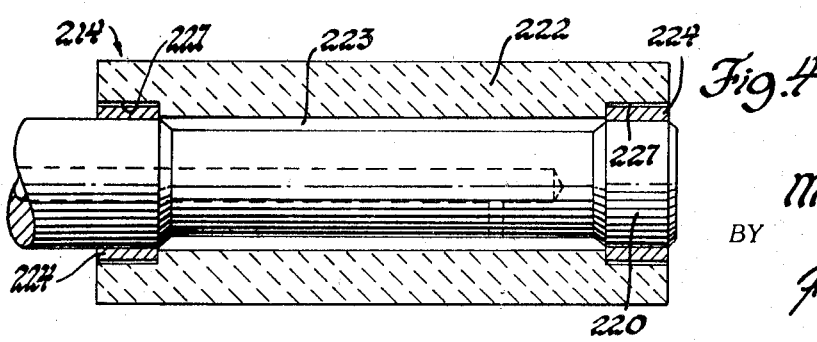
FIG. 4 is an elevation partially in section of a third embodiment of the invention with the roll shell removed for simplicity.

In the FIG. 4 or third embodiment, the shaft assembly 214 uses a floating permeable sleeve 222 with counterbores 227 at each end. Annular steel bands 224 mounted on the shaft 220 fit within the counterbores 227. A seal for plenum 223 as well as axial location of the sleeve 222 is provided by urging the bands into tight engagement with the radial face formed by each counterbore. This tight fit produces a compressive axial load on the sleeve 222 and a slight initial radial space between the steel bands 224 and the permeable sleeve counterbores insures against any excessive tensile hoop stress which might be provided by differential thermal expansion.

I wish it to be understood that I do not desire to be limited to the exact details of construction shown and described, for obvious modifications will occur to a person skilled in the art.

I claim:

1. In an externally pressurized gas-bearing roll shell having a stationary member with a supply plenum into which pressurized gas is fed for distribution through a permeable member to a gas film rotatably supporting a cylindrical sleeve on the stationary member, the improvement comprising,
   said stationary member having a groove in its outer circumferential surface,
   said permeable member being concentric with said stationary member and comprising a permeable, low tensile strength sleeve overlying said groove, and
   annular band means mounted on one of said members to effect a seal therebetween to provide said plenum for the reception of pressurized gas and to axially fix said members with respect to each other without producing excessive tensile stresses in the permeable, low tensile strength sleeve.

2. The improvement as defined in claim 1 wherein said annular band means comprises a pair of spaced annular bands mounted on said stationary member, each of said bands being on an opposite side of the groove in said stationary member and sealingly engaging a radial face on said permeable, low tensile strength sleeve.

3. The improvement as defined in claim 1 wherein said annular band means are mounted on the outer periphery of said permeable, low tensile strength sleeve and effect a seal between said sleeve and said stationary member by compressively loading said sleeve into tight engagement with the outer circumferential surface of said stationary member.

4. The improvement as defined in claim 1 wherein said annular band means comprises a perforate sleeve mounted on the outer periphery of said permeable, low tensile strength sleeve which compressively loads said permeable sleeve into tight engagement with said stationary member of opposite sides of said plenum.

5. In an externally pressurized gas-bearing roll shell having a stationary member with a supply plenum into which pressurized gas is fed for distribution through a porous sleeve to a gas film rotatably supporting a cylindrical sleeve on the stationary member, the improvement comprising, said stationary member having a groove in its outer circumferential surface, said porous sleeve having a permeable, low tensile strength and mounted on said member and overlying said groove, and annular band means mounted on the outer periphery of said sleeve and compressing said sleeve into tight engagement with said member without producing excessive tensile stresses in said porous sleeve.

6. The improvement as defined in claim 5 wherein said annular band means comprises a pair of spaced metal bands shrunk fit onto the end portions, respectively, of the permeable sleeve which overlie the portions of the stationary member outer circumferential surface adjacent the groove.

7. The improvement as defined in claim 5 wherein said annular band means comprises a perforate sleeve mounted on the outer periphery of said permeable, low tensile strength sleeve, said perforate sleeve being of a relatively high tensile strength material and of the same material as said cylindrical sleeve.

* * * * *